(12) United States Patent
Weber et al.

(10) Patent No.: US 8,649,548 B1
(45) Date of Patent: Feb. 11, 2014

(54) STRUCTURE HAVING ACOUSTIC TRANSDUCER VOLUME

(75) Inventors: Martin Amandus Weber, Esslingen (DE); Donald J. MacLellan, Hudson, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 13/585,525

(22) Filed: Aug. 14, 2012

(51) Int. Cl.
*H04R 1/02* (2006.01)
*H05K 5/00* (2006.01)

(52) U.S. Cl.
USPC .......................... 381/389; 181/148; 181/150

(58) Field of Classification Search
USPC .......................... 381/365, 302, 71.4, 86, 389; 181/148–150
See application file for complete search history.

(56) References Cited

U.S. PATENT DOCUMENTS 8,044,413 B2   10/2011  Albus et al.

FOREIGN PATENT DOCUMENTS

| DE | 10 2008 024 705 A1 | 11/2009 |
|----|---|---|
| EP | 0 904 985 B1 | 3/1999 |
| EP | 1498317 A1 | 1/2005 |
| JP | S61132443 A | 6/1986 |
| WO | 2012134730 A1 | 10/2012 |

OTHER PUBLICATIONS

International Search Report and Written Opinion for corresponding PCT/US2013/051215 dated Oct. 4, 2013 (10 pages).

*Primary Examiner* — Brian Ensey
*Assistant Examiner* — Norman Yu
(74) *Attorney, Agent, or Firm* — Brian M. Dingman; Dingman IP Law, PC (57) ABSTRACT

A transducer assembly includes a first enclosure element, an electro-acoustic transducer coupled to the first enclosure element, and a second enclosure element. The first enclosure element and the second enclosure element are configured to capture a portion of an automobile frame there between and to define an acoustic volume relative to the automobile frame.

23 Claims, 10 Drawing Sheets

STRUCTURE HAVING ACOUSTIC TRANSDUCER VOLUME

BACKGROUND

Electro-acoustic transducers are sometimes mounted in enclosures. The enclosure or environment design and volume can have a substantial effect on the quality of the transducer output. In certain circumstances, there are both space and shape constraints imposed by the transducer's environment that need to be addressed to provide a successful enclosure design and transducer operation. For example, when a transducer is mounted in the door panel of a vehicle, the transducer must be protected from moisture, such as by sealing to the door panel. Also, the volume that can be devoted to the transducer and its enclosure, and the shape and configuration of such volume, may be severely constrained by the door panel or other vehicle design considerations.

SUMMARY

In general, one aspect of the disclosure features an enclosure assembly comprising a first enclosure element, an electro-acoustic transducer coupled to the first enclosure element, and a second enclosure element. The first enclosure element and the second enclosure element are configured to capture a portion of an automobile frame there between and to define an acoustic volume relative to the automobile frame.

Various implementations of the disclosure may include one or more of the following features. For example, the portion of the automobile frame can include a door frame, the door frame disposed between an inner door portion and an outer door portion, the first enclosure element can be configured to be disposed within a first volume defined between the door frame and an inner door portion, and the second enclosure element can be configured to be disposed within a second volume defined between the door frame and an outer door portion. The first enclosure element and the second enclosure element can be configured to seal the electro-acoustic transducer to the door frame. In one arrangement, the first enclosure element is configured to be secured to the door frame within the first volume and the second enclosure element is integrally formed with the door frame within the second volume. In another arrangement, the first enclosure element is configured to be secured to the door frame within the first volume and the second enclosure element is configured to be secured to the door frame within the second volume.

In one arrangement, the enclosure assembly is configured such that the first enclosure element comprises a first enclosure housing having a perimeter, the perimeter of the first enclosure housing configured to encompass an opening perimeter defined by the door frame, the door frame and the first enclosure housing defining a first enclosure volume and the second enclosure element comprises a second enclosure housing having a perimeter, the perimeter of the second enclosure housing configured to encompass the opening defined by the door frame, the door frame and the second enclosure housing defining a second enclosure volume, the first enclosure volume and the second enclosure volume defining the acoustic volume. In one arrangement the electro-acoustic transducer comprises a front radiating surface that moves along a transducer axis, the transducer axis substantially parallel to a plane of the door frame.

In another example, the portion of the automobile frame can include a fender frame having an inner fender frame portion and an outer fender frame portion, the outer fender frame portion disposed between the inner fender frame portion and a fender, the first enclosure element is configured to be secured to the inner fender frame portion, the electro-acoustic transducer configured to extend from the first enclosure element at least partly within a first volume defined between the inner fender frame portion and the outer fender frame portion, and the second enclosure element is configured to be disposed within a second volume defined between the outer fender frame portion and the fender. In one arrangement, the second enclosure element is integrally formed with the outer fender frame portion within the second volume. In another arrangement, the second enclosure element is configured to be secured to the outer fender frame portion within the second volume.

In one arrangement, the first enclosure element, the inner fender frame portion, and the outer fender frame portion are configured to define a first enclosure volume and the second enclosure element comprises a second enclosure housing having a perimeter, the perimeter of the second enclosure housing configured to encompass the opening defined by the outer fender frame portion, the outer fender frame portion and the second enclosure housing defining a second enclosure volume, the first enclosure volume and the second enclosure volume defining the acoustic volume. In one arrangement, the first enclosure element can include a plate configured to be secured to the inner fender frame portion. In another arrangement, the first enclosure element can be configured as a transducer frame of the electro-acoustic transducer that is configured to be secured to the inner fender frame portion. In one arrangement, the electro-acoustic transducer comprises a front radiating surface that moves along a transducer axis, the transducer axis substantially perpendicular to a plane of the inner fender frame portion.

In one arrangement, the portion of the automobile frame comprises a frame having an inner frame portion and an outer frame portion, the outer frame portion disposed between the inner frame portion and an automobile component. The first enclosure element is configured to be secured to the inner frame portion, the electro-acoustic transducer configured to extend from the first enclosure element at least partly within a first volume defined between the inner frame portion and the outer frame portion. The second enclosure element is configured to be disposed within a second volume defined between the outer frame portion and the automobile component.

In general, another aspect of the disclosure features an automobile door assembly, comprising a door frame disposed between an inner door portion and an outer door portion and an enclosure assembly disposed between the inner door portion and the outer door portion. The transducer assembly comprises a first enclosure element disposed within a first volume defined between the door frame and an inner door portion, an electro-acoustic transducer coupled to the first enclosure element, and a second enclosure element disposed within a second volume defined between the door frame and an outer door portion, the first enclosure element and the second enclosure element configured to capture a portion of the door frame there between, the first enclosure element and the second enclosure element defining an acoustic volume relative to the door frame.

In general, another aspect of the disclosure features an automobile fender frame assembly, comprising a fender frame having an inner fender frame portion and an outer fender frame portion, the outer fender frame portion disposed between the inner fender frame portion and a fender and an enclosure assembly. The enclosure assembly comprises a first enclosure element secured to the inner fender frame portion, an electro-acoustic transducer extending from the first enclosure element at least partly within a first volume defined between the inner fender frame portion and the outer fender frame portion, and a second enclosure element disposed within a second volume defined between the outer fender frame portion and the fender, the first enclosure element and the second enclosure element configured to capture at least a portion of the fender frame there between and to define an acoustic volume relative to the fender frame.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

Arrangements of the innovation relate to an enclosure assembly for utilization within an automobile and which is configured to increase the output level of an associated transducer with respect to relatively low-frequency signals. The enclosure assembly is configured to be installed within a location or drive point of the automobile, such as within a door assembly or a fender assembly, which includes a volume that is typically unused. The enclosure assembly is configured to capture a portion of the automobile and include the automobile's unused volume as part of the assembly. By locating the transducer at a particular drive point, the acoustic coupling between the transducer and the passenger cabin is efficient for a particular frequency range, such as a bass frequency range. Accordingly, the enclosure assembly taken in conjunction with the automobile can enhance the bass response of the associated transducer while minimizing the need to change the structure of the automobile itself.

Figure 1:
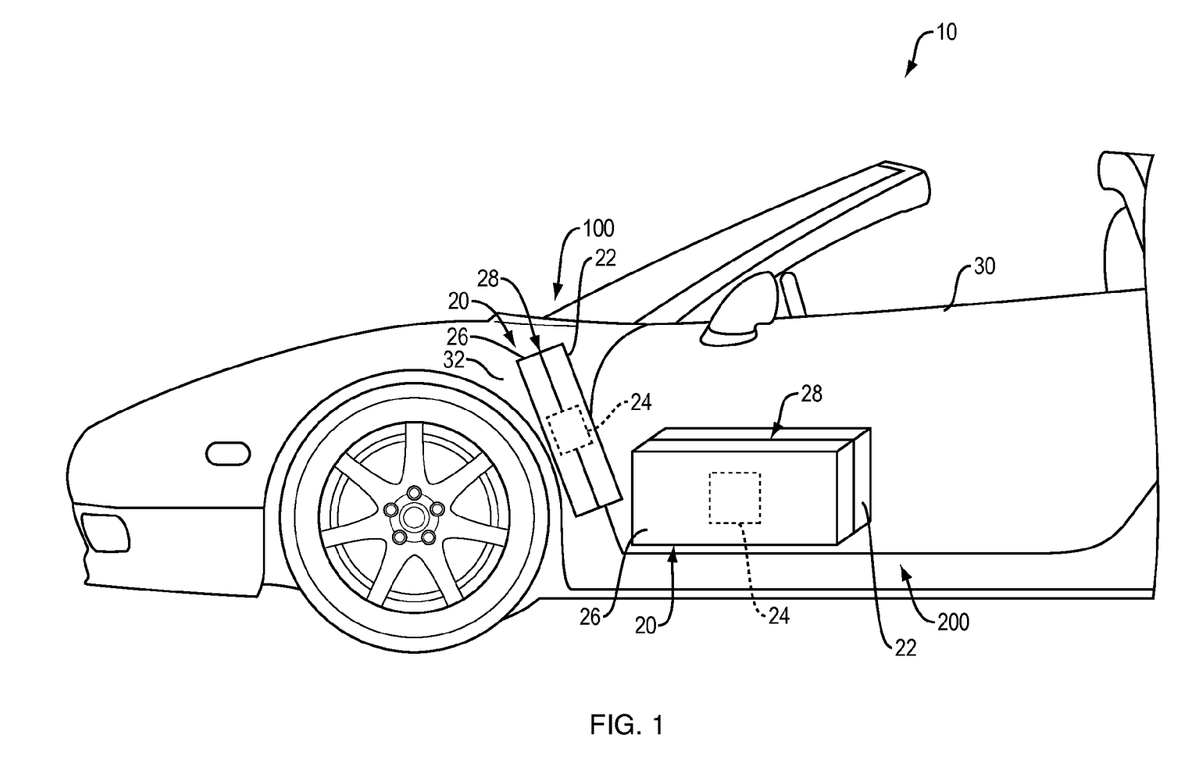
FIG. 1 illustrates an automobile having an enclosure assembly, shown schematically, disposed within a car door location and within a fender location.

FIG. 1 illustrates an automobile 10 having one or more enclosure assemblies 20, according to one example. In one arrangement, each enclosure assembly 20 includes a first enclosure element 22, an electro-acoustic transducer 24 coupled to the first enclosure element 22, and a second enclosure element 26. The first enclosure element 22 and the second enclosure element 26 are each configured to mount to a portion of an automobile frame (i.e., the structures of a unibody vehicle) 28 to define an acoustic volume relative to the automobile frame 28. For example, the first and second enclosure elements 22, 26 capture a portion of an automobile frame 28 such that the enclosure elements 22, 26 and the automobile frame 28 create a fully or partially enclosed volume behind the electro-acoustic transducer diaphragm. The enclosure assembly 20 defines the volume in conjunction with the existing automobile frame 28 to increase the output level of the transducer 24 with respect to relatively low-frequency signals, such as signals between about 40 Hz and 150 Hz. With an increased output level, the electro-acoustic transducer 24 provides an effective increase in sound output for the relatively low-frequency signals without requiring an increase in the amount of power used to drive the electro-acoustic transducer 24.

The enclosure assembly 20 can be disposed within the automobile 10 in a variety of locations, as illustrated. For example, and as described in detail below, a first enclosure assembly 100 is secured to a portion of the automobile 10 located within an automobile door 30 while a second enclosure assembly 200 is secured to a portion of the automobile 10 located within an automobile fender 32.

FIGS. 2-5 illustrate an arrangement of the enclosure assembly 100 disposed within an automobile door assembly 102. The automobile door assembly 102 includes a door frame 128 disposed between an inner door portion 130, such as an interior trim panel, and an outer door portion 132, such as an outer sheet metal element. The inner door portion 130 and the door frame 128 define a first volume 134 sized and shaped to contain the first enclosure element 122 and the electro-acoustic transducer 124 while the outer door portion 132 and the door frame 128 define a second volume 136 configured to contain the second enclosure element 126.

Figure 2:
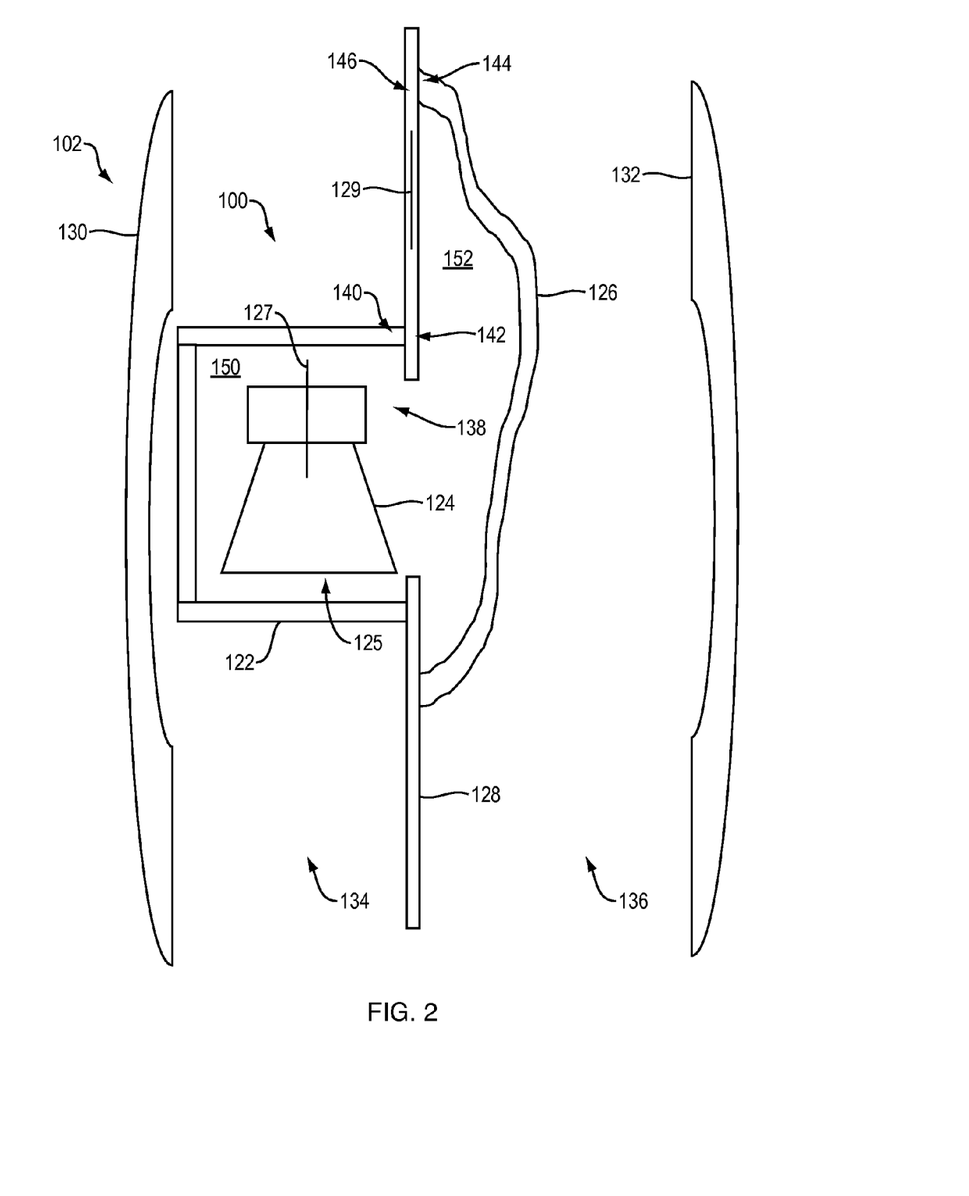
FIG. 2 illustrates a top, schematic view of an automobile door assembly of FIG. 1 having an enclosure assembly disposed therein.
Figure 3:
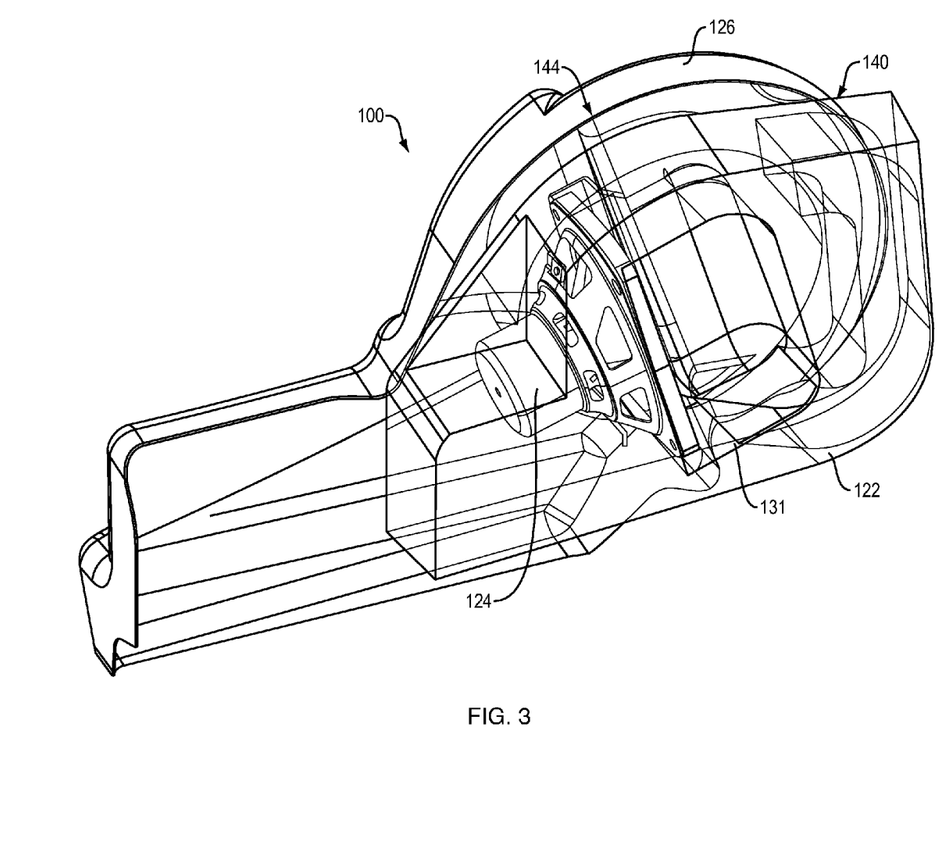
FIG. 3 illustrates a perspective view of the enclosure assembly of FIG. 2, according to one arrangement.
Figure 4:
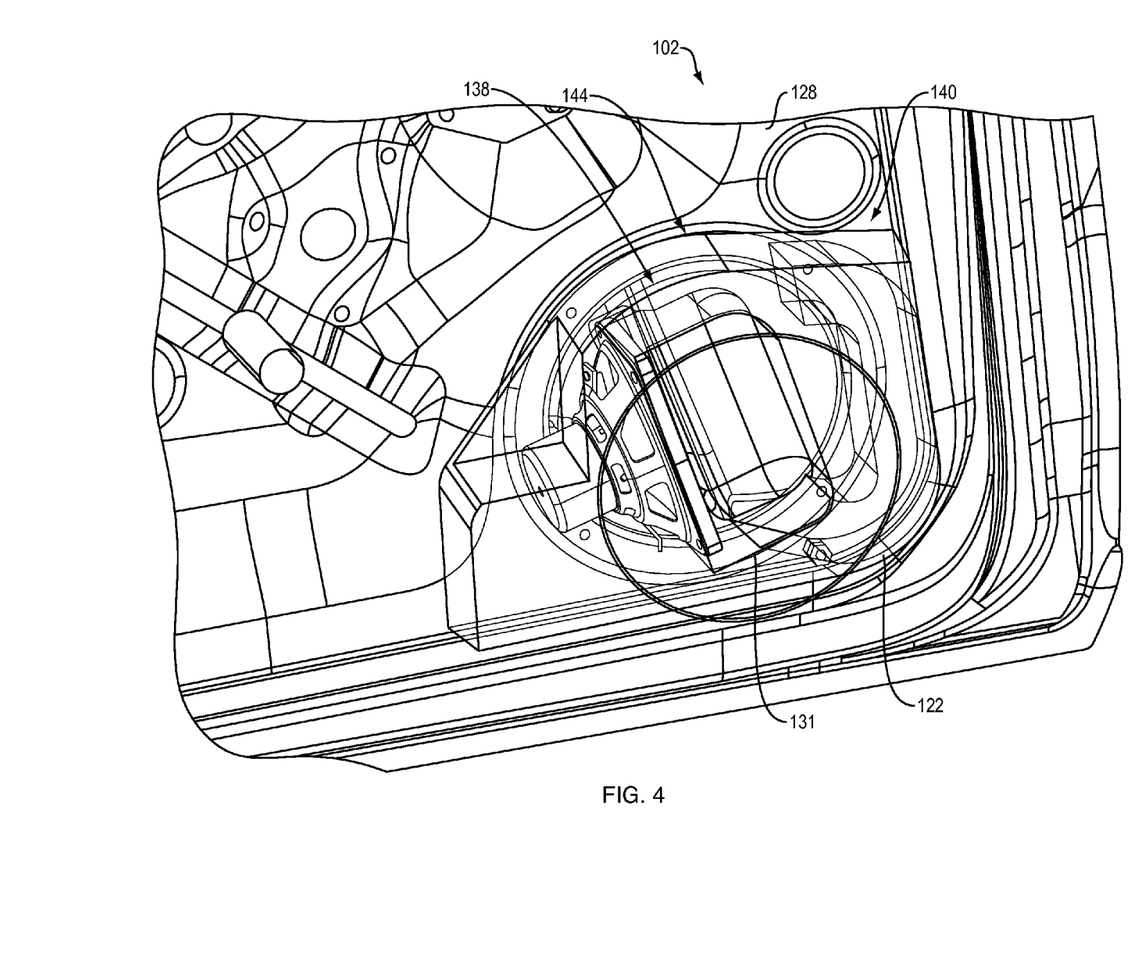
FIG. 4 illustrates a first side view of the enclosure assembly of FIG. 2 secured to an inner door portion of the automobile door, according to one arrangement.
Figure 5:
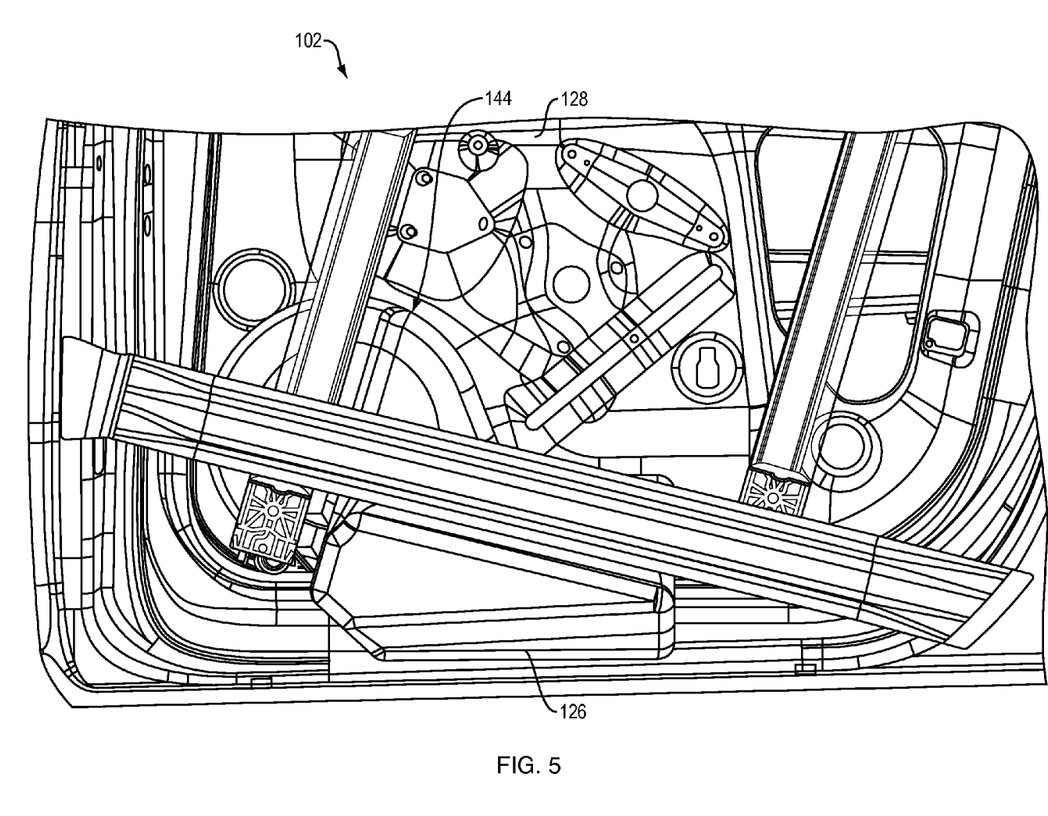
FIG. 5 illustrates a second side view of the enclosure assembly of FIG. 2 secured to an inner door portion of the automobile door, according to one arrangement.

As illustrated, the door frame 128 defines an opening 138. In one arrangement, an automobile door manufacturer forms the opening 138 in the door frame 128 to allow conventional mounting of an electro-acoustic transducer to the automobile door assembly 102 (i.e., the conventional electro-acoustic transducer being mounted such that a front radiating surface of the transducer that moves along a transducer axis that substantially perpendicular to a plane of the door frame 128). Alternately, an installer can form the opening 138 in the door frame 128 to allow communication between the first and second volumes 134, 136 and to allow installation of the enclosure assembly 20 as an after-market addition.

The enclosure assembly 100 fits within the volumes 134, 136 defined by the door assembly 102 and couples to the door frame 128 relative to the opening 138 to define an enclosure volume configured to increase the relatively low frequency output level of the electro-acoustic transducer 124.

For example, the first enclosure element 122 having the electro-acoustic transducer 124 is disposed within the first volume 134 and secured to the door frame 128. In one arrangement, the first enclosure element 122 is mounted to the door frame 128 such that a front radiating surface 125 of the electro-acoustic transducer 124 is configured to move along a transducer axis 127 that is substantially parallel to a plane 129 of the door frame 128. Additionally, the first enclosure element 122 secured to the door frame 128 such that a perimeter 140 of the first enclosure element 122 is disposed about an outer perimeter 142 of the opening 138. In one arrangement, the first enclosure element 122 includes a seal, such as a gasket, disposed at the perimeter 140 that seals the first enclosure element 122 to the door frame 128. It should be noted that while the first enclosure element 122 can be sealed to the door frame 128 to define an enclosed volume 150, in one arrangement the volume 150 can be partially open. For example, the first enclosure element 122 can include a port 131 (FIGS. 3 and 4) that leads from the enclosure volume 150 to a listening area within the automobile 10.

The second enclosure element 126 is disposed within the second volume 136 such that a perimeter 144 of the second enclosure element 126 is disposed about an outer portion or perimeter 146 of the opening 138. The second enclosure element 126 can be configured in a variety of ways. In one arrangement, the second enclosure element 126 can be configured as an add-on element that a manufacturer secures to the door frame 138 within the second volume 136. For example, the second enclosure element 126 can be configured as a plastic shell element having a seal, such as a gasket, disposed at the perimeter 144. In such an example, the interface between the perimeter 144 of the second enclosure element 126 and the perimeter 146 of the opening 138 forms a seal between the second enclosure element 126 and the door frame 128 to minimize leakage of fluids within the enclosure assembly 100 during operation. In another example, the second enclosure element 126 can be integrally formed with the door frame 128 such that the perimeter 144 of the second enclosure element 126 and the perimeter 146 of the opening 138 are substantially continuous. Such continuity between the second enclosure element 126 and the door frame 128 also minimizes leakage of fluids within the enclosure assembly 100 during operation.

With the first enclosure element 122 and the second enclosure element 126 mounted on either side of the door frame 128, each element 122, 126 of the enclosure assembly 100 defines a respective first and second enclosure volume 150, 152 relative to the door frame 128. Additionally, with the first and second enclosure elements 122, 124 disposed about the perimeters 142, 146 of the opening 138, the total acoustic volume of the enclosure assembly 100 includes both the first enclosure volume 150 and the second enclosure volume 152. Accordingly, the door frame 128 is acoustically transparent relative to the enclosure assembly 100 during operation. Based upon the available (i.e., unused) volumes 134, 136 in the automobile door assembly 102, the total acoustic volume of the enclosure assembly 100 can be sized and shaped to increase the output level of the electro-acoustic transducer 124 with respect to relatively low-frequency signals, such as signals between about 40 Hz and 150 Hz. Accordingly, the enclosure assembly 100 taken in conjunction with the door frame 128 enhances the bass response of the electro-acoustic transducer 24.

As indicated above with reference to FIG. 1, the automobile 10 can include a enclosure assembly 200 located at least partly within an automobile fender 32.

Figure 6:
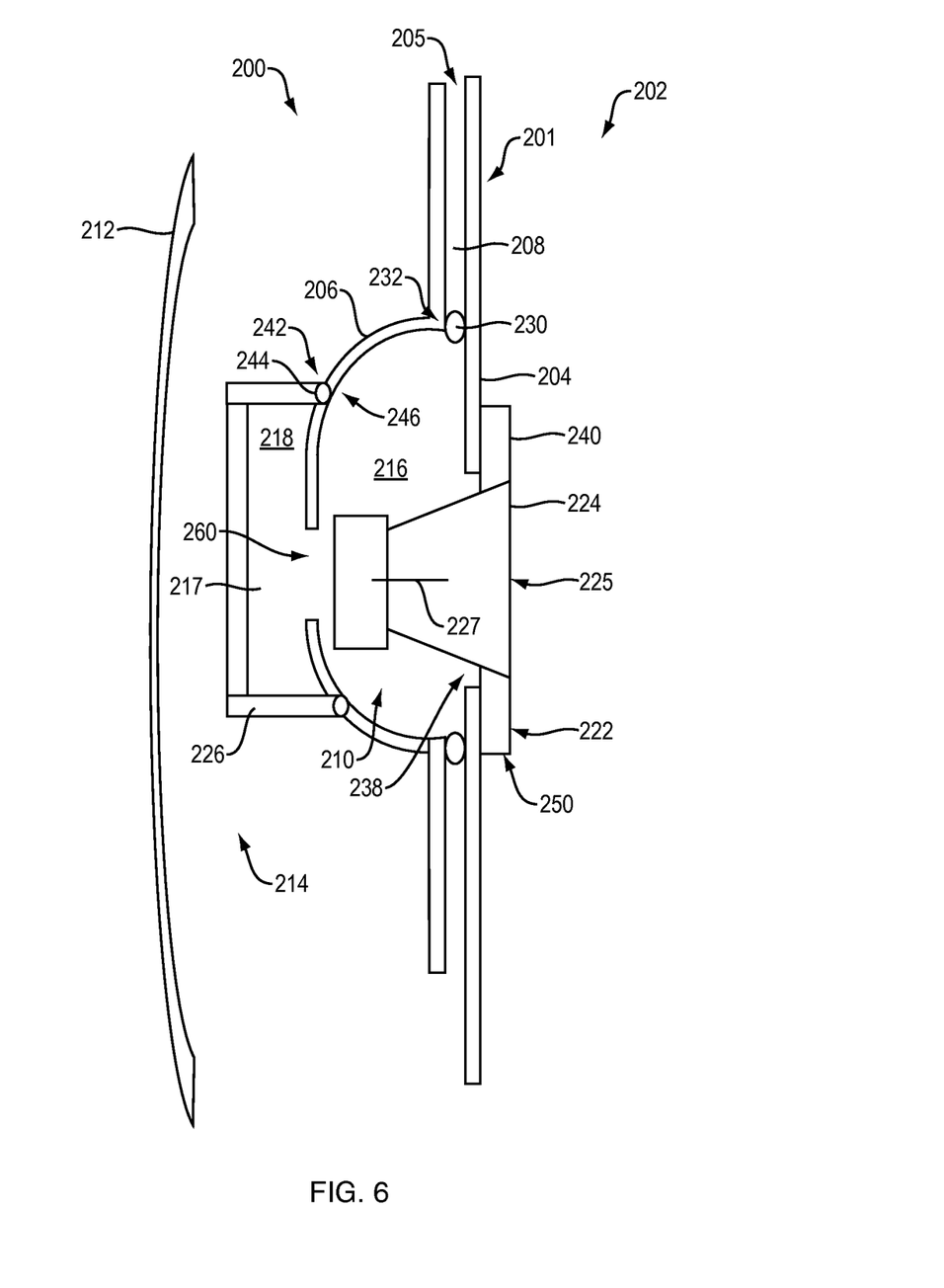
FIG. 6 illustrates a side, schematic view of an automobile fender frame assembly of FIG. 1 having an enclosure assembly disposed therein.

FIG. 6 illustrates a schematic representation of an arrangement of the enclosure assembly 200 disposed within an automobile fender frame assembly 202. The automobile fender frame assembly 202 includes a fender frame 201 having an inner fender frame portion or kick panel 204 and an outer fender frame portion 206. In certain conventional automobiles, the inner fender frame portion 204 and the outer fender frame portion 206 are formed as non-joined abutting elements and define a gap 205 there between. As illustrated, the gap 205 between the frame portions 204, 206 widens at a portion of the frame assembly 202 to define a first volume or chamber 210 within the automobile 10. This volume 210 is typically unutilized by other components associated with the automobile 10. The automobile fender frame assembly 202 also includes a fender portion 212, such as an outer sheet metal element, disposed adjacent to the outer fender frame portion 206 to define a second volume 214 within the automobile. The volumes 210, 214 defined by the automobile fender frame assembly 202 are configured to contain at least portions of the first and second enclosure elements 222, 226 of the enclosure assembly 200 to allow the creation of an acoustic volume within the automobile fender frame assembly 202. This acoustic volume is utilized to increase the output level of an electro-acoustic transducer 124 of the enclosure assembly 200 with respect to relatively low-frequency signals.

Figure 9:
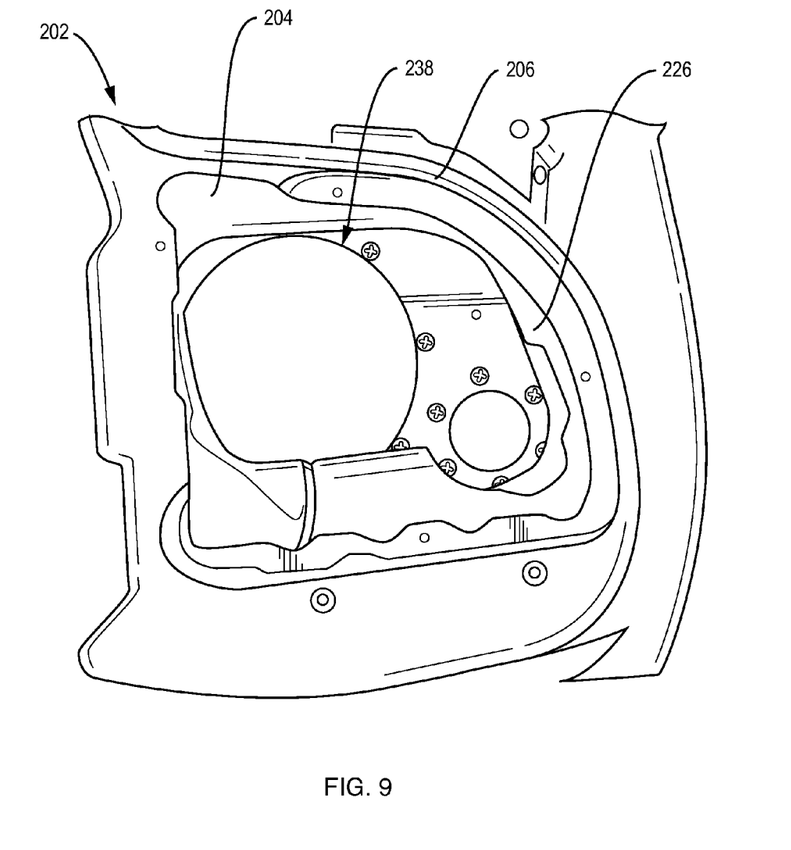
FIG. 9 illustrates an automobile fender frame of the automobile fender frame assembly of FIG. 6, according to one arrangement.

In one arrangement, the chamber 210 in combination with the first enclosure element 222 defines a first portion or volume 216 of the acoustic volume. For example, with additional reference to FIG. 9, an installer forms an opening 238 in the inner fender frame portion 204. To seal the chamber 210 relative to the external environment, the installer applies a sealing material 230, such as a silicon material, within the gap 205 between a periphery 232 of the outer fender frame portion 206 and the inner fender frame portion 204. The installer then secures the first enclosure element 222 to the inner fender frame portion 204 such that part of the electro-acoustic transducer 234 extends through the opening 238 and into the chamber 210 and such that a front radiating surface 225 of the electro-acoustic transducer 224 is configured to move along a transducer axis 227. With such positioning relative to the opening 238, the first enclosure element 222 is configured to operate in an infinite baffle configuration.

Figure 8:
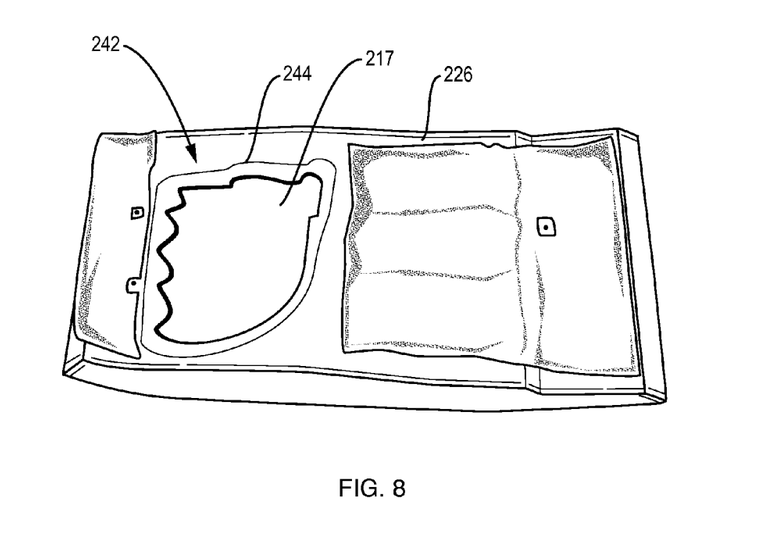
FIG. 8 illustrates a second enclosure element of the enclosure assembly of FIG. 6, according to one arrangement.

Additionally, the outer fender frame portion 206 and the second enclosure element 226 define a second portion or volume 218 of the acoustic volume. For example, as illustrated in FIG. 6, the outer fender frame potion 206 defines one or more openings 260 that provide communication between the chamber 210 and the second volume 214. In such a case the installer can utilize the second enclosure element 226 to seal the openings 260 and form the enclosed volume 218 within the second volume 214. For example, in one arrangement, the second enclosure element 226 is configured as an add-on element that an installer secures to the outer fender frame portion 206 within the second volume 214. With reference to FIG. 8, the second enclosure element 226 can be configured as a foam or plastic shell element defining a chamber 217 having a seal, such as a gasket 244, disposed about a perimeter 242 of an opening associated with the second enclosure element 226.

To install the second enclosure element 226 to the outer fender frame portion 206, the installer disposes the second enclosure element 226 within the second volume 214, places the gasket 244 in contact with the outer fender frame portion 206 such that the perimeter 242 of the second enclosure element 226 is disposed about an outer perimeter 246 of the openings 260. The installer then secures the second enclosure element 226 to the outer fender frame portion 206 to form the enclosed volume 218 between the second enclosure element 226 and the outer fender frame portion 206.

As indicated, the first enclosure element 222 and the second enclosure element 226 are mounted on either side of the fender frame 201 with openings 260 providing communication between the first and second acoustic volumes 216, 218. Accordingly, the total acoustic volume of the enclosure assembly 200 includes both the first enclosure volume 216 and the second enclosure volume 218. By utilizing the available (i.e., unused) volumes 210, 214 in the automobile fender frame assembly 202, the total acoustic volume of the enclosure assembly 200 can be configured to increase the output level of the electro-acoustic transducer 224 with respect to relatively low-frequency signals, such as signals between about 40 Hz and 150 Hz.

Figure 10:
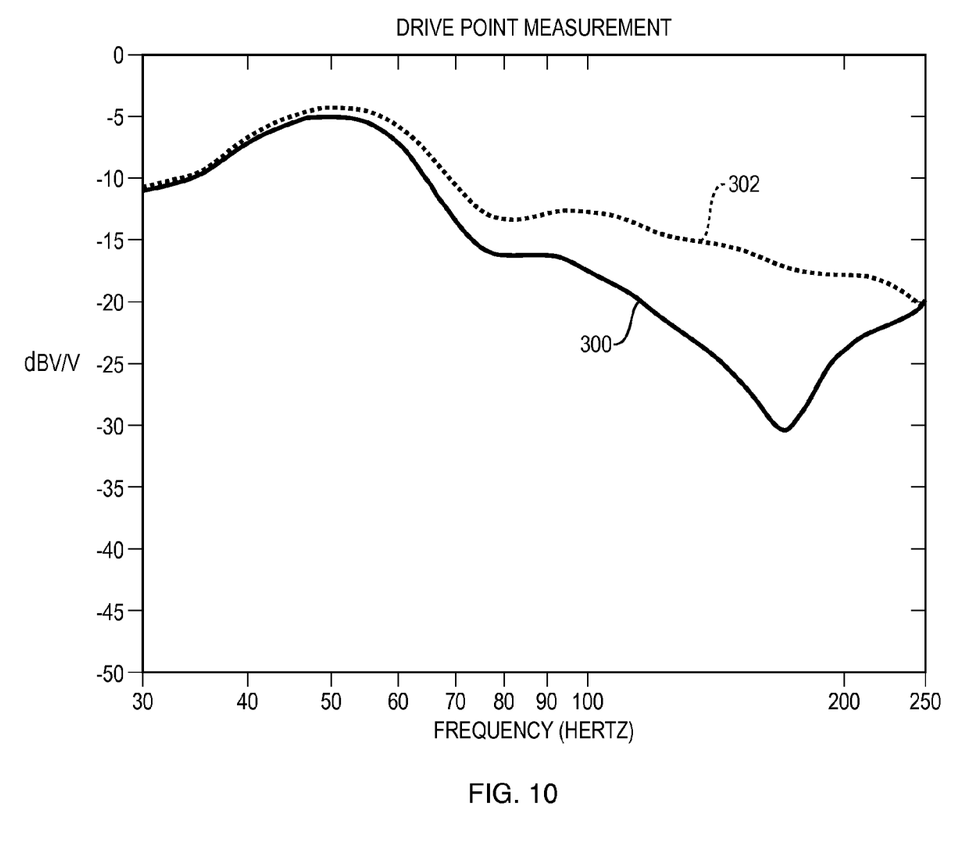
FIG. 10 illustrates an example of an output level measurement for a conventional enclosure assembly and an enclosure assembly mounted within an automobile fender frame assembly, according to one arrangement.

For example, FIG. 10 illustrates a frequency response curve 300 for a conventional enclosure assembly and a frequency response curve 302 for the enclosure assembly 200 mounted within the automobile fender frame assembly 202. As shown, the frequency response curve 302 illustrates an increased output level for frequencies between about 60 Hz and 250 Hz, compared the frequency response curve 300. Accordingly, the enclosure assembly 200, in conjunction with the automobile fender frame assembly 202, enhances the bass response of the electro-acoustic transducer 224. With an increased output level, the electro-acoustic transducer 224 provides an effective increase in sound output for the relatively low-frequency signals without requiring an increase in the amount of power used to drive the electro-acoustic transducer 224.

It should be noted that the enclosure assembly 200 of FIGS. 6-9 can be configured in a variety of different ways.

Figure 7:
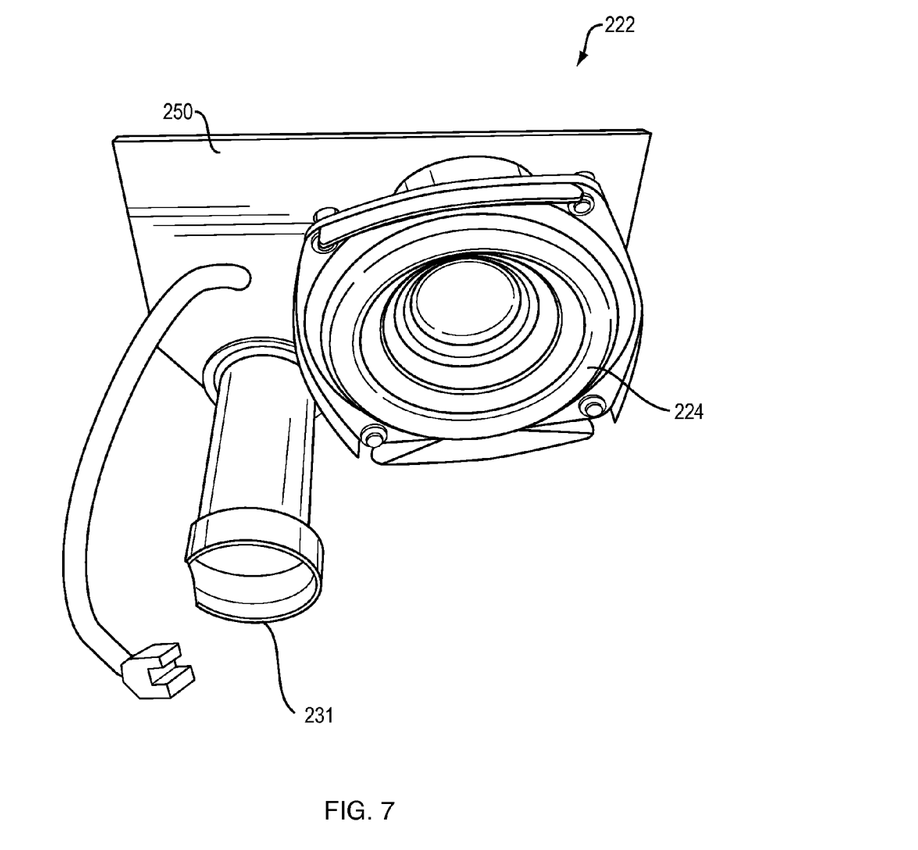
FIG. 7 illustrates a first enclosure element of the enclosure assembly of FIG. 6, according to one arrangement.

For example, with reference to FIG. 6, it should be noted that the first enclosure element 222 can be configured to allow coupling of the electro-acoustic transducer 224 to the inner fender frame portion 204 in a variety of ways. For example, in one arrangement as shown in FIGS. 6 and 7, the first enclosure element 222 is configured as a plate 250 which carries the electro-acoustic transducer 224 and which is secured to the inner fender frame portion 204. In another arrangement, the first enclosure element 222 is configured as the basket or transducer frame of the electro-acoustic transducer 224 (not shown) which is used to secure the electro-acoustic transducer 224 directly to the inner fender frame portion 204.

In one arrangement, the first enclosure element 222 includes a seal, such as a gasket, disposed at the perimeter 240 that seals the first enclosure element 222 to the inner fender frame portion 204 to close the volume 216 from the environment. Alternately, in one arrangement the volume 216 can be partially open. For example, with reference to FIG. 7, the first enclosure element 222 can include a port 231 that leads from the enclosure volume 216 to a listening area within the automobile 10.

In one arrangement, as indicated above, the second enclosure element 226 can be configured as an add-on element that a manufacturer secures to the outer fender frame portion 206 within the second volume 214. Such indication is by way of example only. In another arrangement, the second enclosure element 226 can be integrally formed with the outer fender frame portion 206 such that the perimeter 242 of the second enclosure element 226 is and the perimeter 246 of the outer fender frame portion 206 are substantially continuous.

As indicated above, the automobile 10 can include the enclosure assembly 200 located at least partly within an automobile fender frame assembly 202 where the automobile fender frame assembly 202 includes a fender frame 201 having an inner fender frame portion or kick panel 204 and an outer fender frame portion 206. Such description is by way of example only. In one arrangement, the enclosure assembly 200 can be located at least partly within any frame assembly associated with the automobile where the frame assembly includes an inner frame portion and an outer frame portion defining a volume there between.

For example, certain automobiles include a floor frame assembly located at an outboard front bottom corner of an interior portion of the automobile, at a joint between the automobile's floor and the firewall. The floor frame assembly includes an interior frame portion, such as an inner layer of floor sheet metal, and an outer frame portion, such as an outer layer of floor sheet metal. The interior frame portion defines a relatively shallow curve, while the exterior frame portion defines a substantially sharp (i.e., right-angle) curve as well as a plurality of openings extending between the exterior frame portion and the firewall. An installer can form an opening for the transducer within the interior frame portion and can dispose the second enclosure element 226 within the space between the exterior frame portion and the firewall.

It should be noted that the enclosure assembly 100 of FIGS. 2-5 can also be configured in a variety of different ways.

For example, as indicated above, the first enclosure element 122 is mounted to the door frame 128 such that a front radiating surface 125 of the electro-acoustic transducer 124 is configured to move along a transducer axis 127 that is substantially parallel to a plane 129 of the door frame 128 (e.g., a forward firing orientation). Such indication is by way of example only. In one arrangement, the electro-acoustic transducer 124 is disposed within the first enclosure element 122 such that the front radiating surface 125 of the electro-acoustic transducer 124 is configured to move along a transducer axis 127 that is substantially perpendicular to a plane 129 of the door frame 128 (e.g., an inward firing orientation).

While various embodiments of the innovation have been particularly shown and described, it will be understood by those skilled in the art that various changes in form and details may be made therein without departing from the spirit and scope of the innovation as defined by the appended claims.

What is claimed is:

1. An enclosure assembly, comprising:
   a first enclosure element;
   an electro-acoustic transducer coupled to the first enclosure element;
   a second enclosure element, the first enclosure element and the second enclosure element configured to capture a portion of an automobile frame there between and to define an acoustic volume relative to the automobile frame;
   wherein the portion of the automobile frame comprises a door frame, the door frame disposed between an inner door portion and an outer door portion;
   the first enclosure element is configured to be disposed within a first volume defined between the door frame and an inner door portion;
   the second enclosure element is configured to be disposed within a second volume defined between the door frame and an outer door portion; and
   wherein the first enclosure element and the second enclosure element are configured to seal the electro-acoustic transducer to the door frame.

2. The enclosure assembly of claim 1, wherein:
   the first enclosure element is configured to be secured to the door frame within the first volume; and
   the second enclosure element is integrally formed with the door frame within the second volume.

3. The enclosure assembly of claim 1, wherein:
   the first enclosure element is configured to be secured to the door frame within the first volume; and
   the second enclosure element is configured to be secured to the door frame within the second volume.

4. The enclosure assembly of claim 1, wherein:
   the first enclosure element comprises a first enclosure housing having a perimeter, the perimeter of the first enclosure housing configured to encompass an opening perimeter defined by the door frame, the door frame and the first enclosure housing defining a first enclosure volume; and the second enclosure element comprises a second enclosure housing having a perimeter, the perimeter of the second enclosure housing configured to encompass the opening defined by the door frame, the door frame and the second enclosure housing defining a second enclosure volume, the first enclosure volume and the second enclosure volume defining the acoustic volume.

5. The enclosure assembly of claim 1, wherein the electro-acoustic transducer comprises a front radiating surface that moves along a transducer axis, the transducer axis substantially parallel to a plane of the door frame.

6. An enclosure assembly, comprising:
a first enclosure element;
an electro-acoustic transducer coupled to the first enclosure element; and
a second enclosure element, the first enclosure element and the second enclosure element configured to capture a portion of an automobile frame there between and to define an acoustic volume relative to the automobile frame;
wherein the portion of the automobile frame comprises a fender frame having an inner fender frame portion and an outer fender frame portion, the outer fender frame portion disposed between the inner fender frame portion and a fender;
the first enclosure element is configured to be secured to the inner fender frame portion, the electro-acoustic transducer configured to extend from the first enclosure element at least partly within a first volume defined between the inner fender frame portion and the outer fender frame portion; and
the second enclosure element is configured to be disposed within a second volume defined between the outer fender frame portion and the fender.

7. The enclosure assembly of claim 6, wherein the second enclosure element is integrally formed with the outer fender frame portion within the second volume.

8. The enclosure assembly of claim 6, wherein the second enclosure element is configured to be secured to the outer fender frame portion within the second volume.

9. The enclosure assembly of claim 6, wherein:
the first enclosure element, the inner fender frame portion, and the outer fender frame portion are configured to define a first enclosure volume; and
the second enclosure element comprises a second enclosure housing having a perimeter, the perimeter of the second enclosure housing configured to encompass the opening defined by the outer fender frame portion, the outer fender frame portion and the second enclosure housing defining a second enclosure volume, the first enclosure volume and the second enclosure volume defining the acoustic volume.

10. The enclosure assembly of claim 6, wherein the electro-acoustic transducer comprises a front radiating surface that moves along a transducer axis, the transducer axis substantially perpendicular to a plane of the inner fender frame portion.

11. The enclosure assembly of claim 6, wherein the first enclosure element comprises a plate configured to be secured to the inner fender frame portion.

12. The enclosure assembly of claim 6, wherein the first enclosure element is configured as a transducer frame of the electro-acoustic transducer and is configured to be secured to the inner fender frame portion.

13. An automobile door assembly, comprising: a door frame disposed between an inner door portion and an outer door portion; and an enclosure assembly disposed between the inner door portion and the outer door portion, the enclosure assembly comprising: a first enclosure element disposed within a first volume defined between the door frame and an inner door portion; an electro-acoustic transducer coupled to the first enclosure element; and a second enclosure element disposed within a second volume defined between the door frame and an outer door portion, the first enclosure element and the second enclosure element configured to capture a portion of the door frame there between, the first enclosure element and the second enclosure element defining an acoustic volume relative to the door frame; wherein the first enclosure element and the second enclosure element seal the electro-acoustic transducer to the door frame.

14. The automobile door assembly of claim 13, wherein:
the first enclosure element is secured to the door frame within the first volume; and
the second enclosure element is integrally formed with the door frame within the second volume.

15. The automobile door assembly of claim 13, wherein:
the first enclosure element is secured to the door frame within the first volume; and
the second enclosure element is secured to the door frame within the second volume.

16. The automobile door assembly of claim 13, wherein:
the first enclosure element comprises a first enclosure housing having a perimeter, the perimeter of the first enclosure housing encompassing an opening defined by the door frame, the door frame and the first enclosure housing defining a first enclosure volume; and
the second enclosure element comprises a second enclosure housing having a perimeter, the perimeter of the second enclosure housing encompassing the opening defined by the door frame, the door frame and the second enclosure housing defining a second enclosure volume, the first enclosure volume and the second enclosure volume defining the acoustic volume.

17. An automobile fender frame assembly, comprising:
a fender frame having an inner fender frame portion and an outer fender frame portion, the outer fender frame portion disposed between the inner fender frame portion and a fender; and
an enclosure assembly, comprising:
a first enclosure element secured to the inner fender frame portion;
an electro-acoustic transducer extending from the first enclosure element at least partly within a first volume defined between the inner fender frame portion and the outer fender frame portion; and
a second enclosure element disposed within a second volume defined between the outer fender frame portion and the fender, the first enclosure element and the second enclosure element configured to capture at least a portion of the fender frame there between and to define an acoustic volume relative to the fender frame.

18. The automobile fender frame assembly of claim 17, wherein the second enclosure element is integrally formed with the outer fender frame portion within the second volume.

19. The automobile fender frame assembly of claim 17, wherein the second enclosure element is configured to be secured to the outer fender frame portion within the second volume.

20. The automobile fender frame assembly of claim 17, wherein:

the first enclosure element, the inner fender frame portion, and the outer fender frame portion are configured to define a first enclosure volume; and the second enclosure element comprises a second enclosure housing having a perimeter, the perimeter of the second enclosure housing configured to encompass the opening defined by the outer fender frame portion, the outer fender frame portion and the second enclosure housing defining a second enclosure volume, the first enclosure volume and the second enclosure volume defining the acoustic volume.

21. The automobile fender frame assembly of claim 17, wherein the first enclosure element comprises a plate secured to the inner fender frame portion.

22. The automobile fender frame assembly of claim 17, wherein the first enclosure element is configured as a transducer frame of the electro-acoustic transducer, the transducer frame secured to the inner fender frame portion.

23. The enclosure assembly of claim 1, wherein the portion of the automobile frame comprises a frame having an inner frame portion and an outer frame portion, the outer frame portion disposed between the inner frame portion and an automobile component;

the first enclosure element is configured to be secured to the inner frame portion, the electro-acoustic transducer configured to extend from the first enclosure element at least partly within a first volume defined between the inner frame portion and the outer frame portion; and the second enclosure element is configured to be disposed within a second volume defined between the outer frame portion and the automobile component.

\* \* \* \* \*